(12) United States Patent
Goetz et al.

(10) Patent No.: US 9,291,228 B2
(45) Date of Patent: Mar. 22, 2016

(54) VIBRATION ABSORBER

(71) Applicant: TrelleborgVibracoustic GmbH, Darmstadt (DE)

(72) Inventors: Frederik Goetz, Breisach (DE); Zehra Ucak, Schliengen (DE); Friedrich Back, Muelheim (DE)

(73) Assignee: TRELLEBORGVIBRACOUSTIC GMBH, Darmstadt (DE)

( * ) Notice: Subject to any disclaimer, the term of this patent is extended or adjusted under 35 U.S.C. 154(b) by 0 days.

(21) Appl. No.: 14/225,552

(22) Filed: Mar. 26, 2014

(65) Prior Publication Data

US 2014/0291094 A1 Oct. 2, 2014

(30) Foreign Application Priority Data

Mar. 26, 2013 (DE) .......................... 10 2013 103 110

(51) Int. Cl.
*F16F 7/108* (2006.01)
*F16F 1/38* (2006.01)

(52) U.S. Cl.
CPC ................ *F16F 7/108* (2013.01); *F16F 1/3828* (2013.01); *F16F 1/3863* (2013.01)

(58) Field of Classification Search
CPC ............. F16F 7/10; F16F 1/104; F16F 7/108; F16F 13/10; F16F 13/14
USPC ........................................... 267/140–140.13
See application file for complete search history.

(56) References Cited

U.S. PATENT DOCUMENTS

| 4,588,174 | A | * | 5/1986 | Konishi | 267/140.12 |
| 4,630,806 | A | * | 12/1986 | Dan et al. | 267/140.12 |
| 5,024,425 | A | * | 6/1991 | Schwerdt | 267/140.12 |
| 5,333,847 | A | * | 8/1994 | Kanda | 267/140.12 |
| 6,168,144 | B1 | * | 1/2001 | Bruehl | 267/140.11 |
| 6,199,841 | B1 | * | 3/2001 | Dandre et al. | 267/140.12 |
| 2005/0035506 | A1 | * | 2/2005 | de Fontenay et al. | 267/140.12 |
| 2005/0035507 | A1 | * | 2/2005 | de Fontenay et al. | 267/140.12 |

FOREIGN PATENT DOCUMENTS

| DE | 102005009677 A1 | 9/2006 |
| DE | 102011008339 A1 | 7/2012 |
| JP | 2004052946 A | 2/2004 |

* cited by examiner

*Primary Examiner* — Vishal Sahni
(74) *Attorney, Agent, or Firm* — Leydig, Voit & Mayer, Ltd.

(57) ABSTRACT

A vibration absorber for damping vibrations of motor vehicle components. The vibration absorber comprises an absorber mass including a passage, and an elastomeric spring member inserted in the passage of the absorber mass. The elastomeric spring member comprises an outer sleeve connecting the elastomeric spring member to the absorber mass, and an inner sleeve for attachment to the motor vehicle component to undergo vibration absorption. An elastomer body interconnects the inner sleeve and the outer sleeve. The elastomeric spring member also includes a securing element. The vibration absorber includes stops that are spaced apart in an axial direction and that cooperate with the securing element to secure the absorber mass in the axial direction.

10 Claims, 2 Drawing Sheets

VIBRATION ABSORBER

CROSS-REFERENCE TO RELATED APPLICATIONS

This application claims priority from German Patent Application No. DE 10 2013 103 110.2, filed Mar. 26, 2013, which is hereby incorporated by reference herein in their entireties.

FIELD

The present invention relates to a vibration absorber for damping vibrations of motor vehicle components, particularly of vibrations in the region of a chassis.

BACKGROUND

Vibration absorbers are used for improving traveling comfort by absorbing vibrations arising during travel or standstill. Conventional vibration absorbers mostly comprise an elastomer spring and an absorber mass that is able to move relative to the elastomer spring. In order to absorb the vibrations, the elastomer spring is firmly connected to a vibrating component. When the component connected to the vibration absorber moves, the absorber mass co-vibrates with a certain delay. The elastomer spring is thereby set in motion so that a damping effect is achieved due to the friction occurring in the elastomer spring.

Here, a distinction is made between absorbers with a purely translational action, which are also referred to as linear absorbers, and absorbers with a rotational action. The following relates to absorbers with a translational action, i.e. linear absorbers, which are predominantly used in the region of the chassis.

Furthermore, linear absorbers can be provided with a securing element, which prevents a detachment of absorber mass and, associated therewith, damage to the surrounding vehicle components in the event of a failure of the elastomer spring. Furthermore, such securing elements can also be used as a stop for limiting the vibration amplitude of the absorber mass in the axial direction.

For example, DE 10 2005 009 677 A1 describes a vibration absorber having an absorber mass and an elastomeric spring member, which comprises an inner sleeve, an outer sleeve and an elastomer body interconnecting the two sleeves. The spring member is pressed into an opening of the absorber mass, with the spring member protruding at the end from a through-hole introduced into the bottom of the absorber mass. The inner sleeve moreover comprises a securing element in the form of a disk, which protrudes radially from the inner sleeve and whose diameter is greater than the diameter of the through-hole. This design, in addition to the securing element, also provides a stop for the absorber mass in an axial direction. The vibration amplitude of the absorber mass is thus limited in an axial direction.

SUMMARY

In an embodiment, the present invention provides a vibration absorber for damping vibrations of motor vehicle components. The vibration absorber comprises an absorber mass including a passage, and an elastomeric spring member inserted in the passage of the absorber mass. The elastomeric spring member comprises an outer sleeve connecting the elastomeric spring member to the absorber mass, and an inner sleeve for attachment to the motor vehicle component to undergo vibration absorption. An elastomer body interconnects the inner sleeve and the outer sleeve. The elastomeric spring member also includes a securing element. The vibration absorber includes stops that are spaced apart in an axial direction and that cooperate with the securing element to secure the absorber mass in the axial direction.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DESCRIPTION

Figure 1:
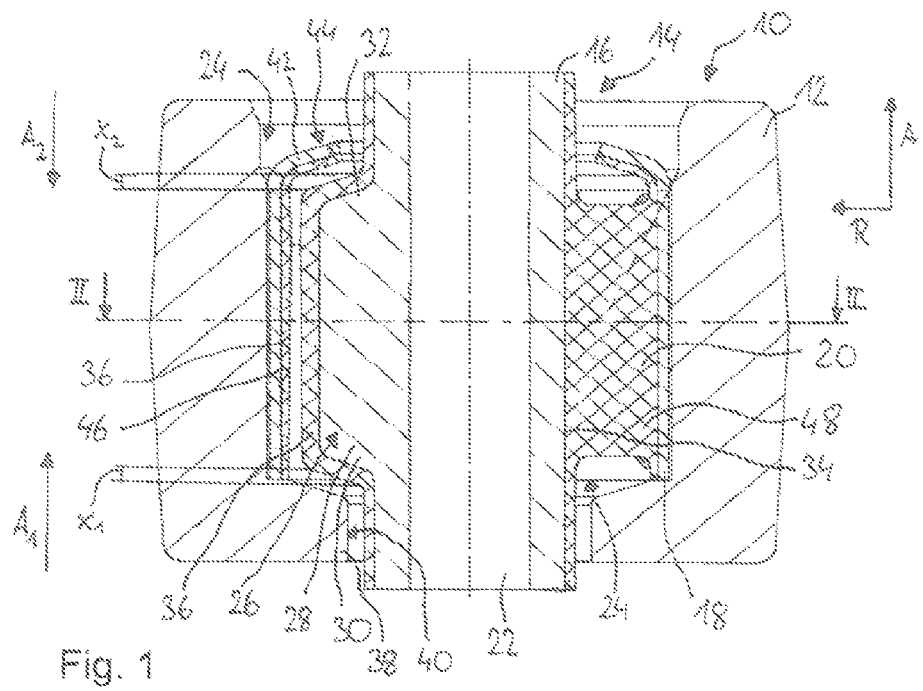
FIG. 1 shows a cross section through a vibration absorber according to the invention according to an embodiment.

An aspect of the present invention provide a vibration absorber that enables a limitation of the vibration amplitude of the absorber mass in all directions in space.

The vibration absorber according to an embodiment of the invention includes an absorber mass and an elastomeric spring member, which comprises an inner sleeve for attachment to the motor vehicle component to undergo absorption, an outer sleeve and an elastomer body interconnecting the two sleeves. The spring member is inserted into a passage of the absorber mass and firmly connected thereto via the outer sleeve. The spring member comprises a securing element that cooperates with stops spaced apart in the axial direction, which secure the absorber mass in both axial directions.

In the vibration absorber according to certain embodiments of the invention, the vibration amplitude of the absorber mass is limited by a cooperation of the securing element and the two stops, so that a high level of elongation of and stress on, and, associated therewith, damage to the elastomer body is prevented. In certain embodiments, the axial distances of the securing element from the stops are configured in such a way that the absorber mass is able, in order to absorb vibrations, to move freely within predefined paths without putting too much stress on the elastomer body or to damage it. Advantageously, the stops are integrated into the design of the vibration absorber. Complex securing measures by means of stops that are to be attached additionally and that are supposed to limit the vibration amplitude of the absorber mass can be dispensed with. Moreover, the elastomer track requires no change. Thus, the vibration absorber according to the invention is cost-effective to produce. In addition, the securing element in combination with the stops prevents the absorber mass from becoming detached due to the elastomer body being torn off. Damage to vehicle components and a loss of the absorber mass is thus avoided. With the vibration absorber according to the invention, it is possible to absorb vibrations in all directions in space.

In one embodiment, the securing element is radially spaced from the outer sleeve. Thus, the absorber mass is able to move freely in the radial direction over a defined path corresponding to the distance from the outer sleeve to the securing element. In the event of too extensive a movement in the radial direction, the absorber mass, or the outer sleeve, abuts against the securing element. The vibration amplitude of the absorber mass is thus additionally limited in the radial direction. The radial distance between the securing element and the outer sleeve is dimensioned in such an advantageous manner that the absorber mass, in order to absorb vibrations, is still able to move freely within a path predefined in the radial direction without damaging the elastomer spring in the process.

In some embodiments, the stops are provided on the absorber mass and/or on the outer sleeve.

In certain embodiments, the securing element comprises at least one projection projecting from the inner sleeve in the radial direction. Advantageously, the projection is configured as a thickened portion provided on the outer circumference of the inner sleeve. The length of the projection in the axial direction is adapted to the respective case of application in such an advantageous manner that the absorber mass is prevented from tumbling.

In some embodiments, several projections are provided, which are disposed on the outer circumference of the inner sleeve, offset in the circumferential direction. This enables the absorber mass to be supported in the radial direction, so that the absorber mass is prevented from tumbling.

In another embodiment, the elastomer body comprises radially projecting spokes.

In some embodiments, the securing element is coated with an elastomer layer. A progressive limitation can thus be accomplished because in case of an axial and/or radial movement, the absorber mass and/or the outer sleeve first abuts against the elastomer layer and, corresponding to the thickness of this layer and the properties of its materials, experiences a corresponding dampening. Furthermore, the elastomer layer can be applied only on the projections and/or the end faces thereof.

A first stop can be advantageously formed from a step of the absorber mass projecting in the direction of the passage.

In an embodiment, a first stop is formed from a radially inwardly bent first portion of the outer sleeve at the end. Also advantageously, a second stop is formed from a radially inwardly bent second portion of the outer sleeve at the end. For this purpose, the outer sleeve is advantageously peripherally flanged, in each case at the end. An inexpensive first and/or second stop integrated into the vibration absorber can thus be produced.

In some embodiments, an inner face of the outer sleeve is provided with an elastomer layer. This contributes additionally to a progressive dampening of the movement of the absorber mass in the axial and radial direction. Depending on the thickness of the elastomer layer and depending on the properties of the material, different rigidities can be obtained.

In an embodiment, the inner sleeve and the outer sleeve are made from metal. Also advantageously, the two sleeves can be produced by casting or extrusion, particularly by means of variable extrusion. Furthermore, the inner sleeve can be made from plastic by means of injection molding.

Embodiments of the invention are explained in more detail below with reference to exemplary embodiments that are schematically shown in the drawings.

The Figures show a vibration absorber 10 with an absorber mass 12 and an elastomeric spring member 14 for damping vibrations of motor vehicle components, particularly the vibrations in the region of a chassis.

The spring member 14 according to FIG. 1 comprises an inner sleeve 16, an outer sleeve 18 and an elastomer body 20 interconnecting the two sleeves 16, 18, which is, in particular, attached by vulcanization. A connection to a motor vehicle component is established via an opening 22 in the inner sleeve 16. The absorber mass 12 and the spring member 14 are arranged concentrically, the spring member 14 being inserted into a passage 24 of the absorber mass 12. As is apparent from FIG. 1, the inner sleeve 16 projects in the axial direction A, in each case at the end, from the passage 24 of the absorber mass 12. In order to fix the spring member 14 in the passage 24, the spring member 14 is pressed into the passage 24 by means of its outer sleeve 18.

Figure 2:
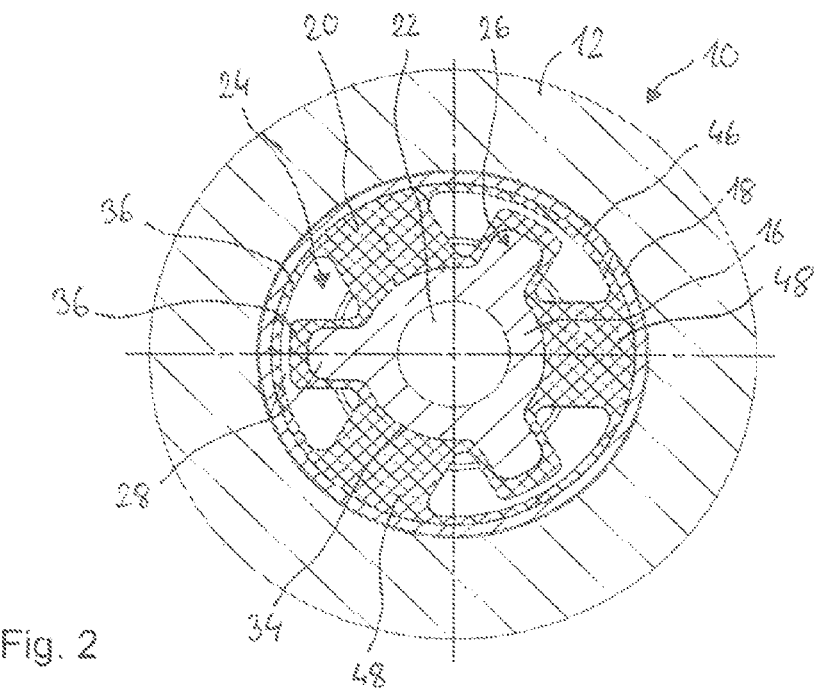
FIG. 2 shows a longitudinal section through the vibration absorber according to the invention along the line II-II in FIG. 1.

The spring member 14 comprises a securing element 26 formed from projections 28 protruding in the radial direction R from the inner sleeve 16. The projections 28 have a first end 30 and a second end 32. As is apparent in FIG. 2, the projections 28 are disposed in an offset manner on the outer circumference 34 of the inner sleeve 16. The length of the projections 28 in the axial direction A is adapted in such a way that the absorber mass 12 is sufficiently supported and a tumbling of the absorber mass 12 is thus prevented. The projections 28 are provided with an elastomer layer 36.

At its end, the absorber mass 12 comprises a peripheral step 38, which projects inwardly in the radial direction R and which is opposite from the first end 30 of the projections 28 and is spaced from it by a first distance x1. The step 38 serves as a first stop 40 in case of a movement of the absorber mass 12 in a first axial direction A1.

The outer sleeve 18 is disposed concentrically to the inner sleeve 16 and connected to the inner sleeve 16 via the elastomer body 20. As is shown in FIG. 1, the outer sleeve 18 has at its end a second portion 42, which is bent, in particular flanged, in the direction of the inner sleeve 16. The bent second portion 42 is opposite from the second end 32 of the projections 28 and is spaced from it by a second distance x2. The inwardly bent second portion 42 serves as a second stop 44 in case of a movement of the absorber mass 12 in a second axial direction A2. An inner surface 46 of the outer sleeve 18, particularly in the region of the projections 28 and in the region of the bent portion 42, is provided with the elastomer layer 36.

In addition, the securing element 26, or the projections 28, are spaced from the outer sleeve 18 in the radial direction R. Thus, the projections 28 act as stops for the absorber mass 12 in case of movement of the same in the radial direction R.

According to the Figures, the elastomer body 20 is inserted between the projections 28, with the elastomer body 20 being configured as spokes 48 projecting in the radial direction R from the inner sleeve 16.

In case of failure of the elastomer body 20, the securing element 26, in combination with the two stops 40, 44, causes the absorber mass 12 to be secured, so that no surrounding motor vehicle components are damaged or that the absorber mass 12 is not lost.

A progressive limitation can be accomplished by means of the elastomer layer 36 on the projections 28 and the inner surface 46 of the outer sleeve 18, because in case of an axial and/or radial movement, the absorber mass 12 and/or the outer sleeve 18 first abuts against the elastomer layer 36 and, corresponding to the thickness of this layer and the properties of its materials, experiences a corresponding dampening.

Figure 3:
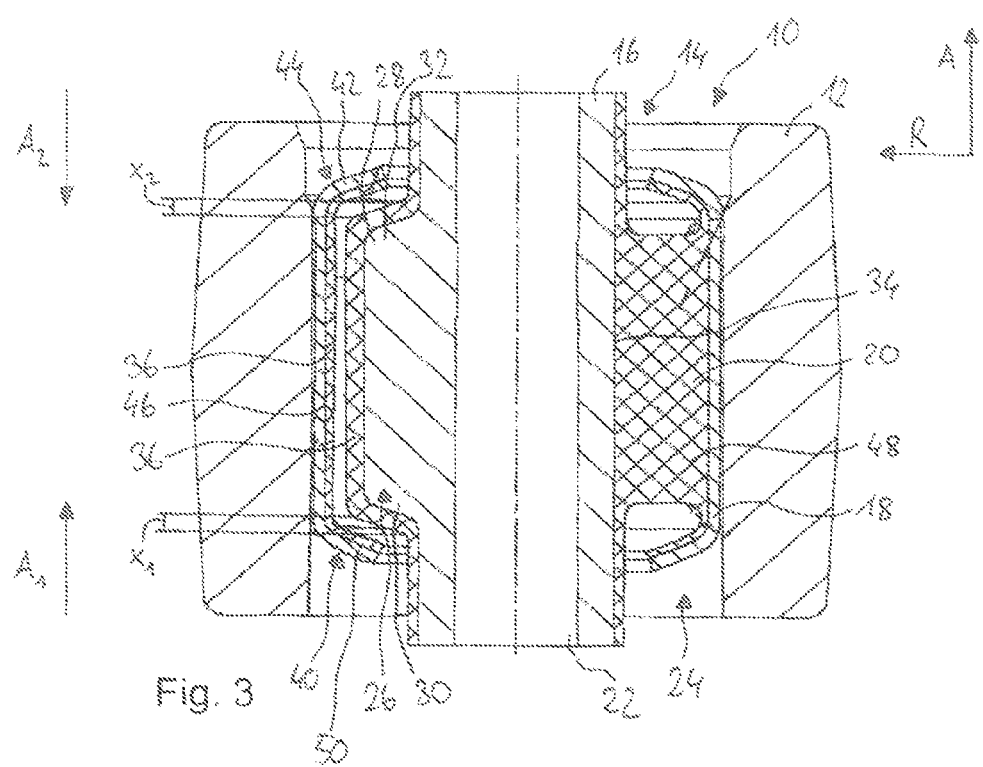
FIG. 3 shows a cross section through a vibration absorber according to the invention according to another embodiment.

FIG. 3 shows another embodiment of the vibration absorber 10 according to the invention, which differs from the embodiment shown in FIG. 1 in that the outer sleeve 18 has at its end a first portion 50 bent, in particular flanged, in the direction of the inner sleeve 16. The bent first portion 50 is opposite from the first end 30 of the projections 28 and is spaced from it by a first distance x1. The inwardly bent first portion 50 serves as a first stop 40 in case of a movement of the absorber mass 12 in the first axial direction A1. The inner surface 46 of the bent first portion 50 is also provided with the elastomer layer 36.

The structure and mode of operation of the second embodiment of the vibration absorber 10 according to the invention corresponds to that of the first embodiment, so that a detailed description is omitted below.

The inner sleeve 16 and the outer sleeve 18 may be made of a metal, wherein both sleeves 16, 18 can be produced by means of casting or extruding. Furthermore, the inner sleeve 16 can be made from a plastic by means of injection molding. The elastomer body 20 and the elastomer layer 36 are inserted by placing the two sleeves 16, 18 into an injection mold and subsequently injecting the elastomer mass. Finally, the injected elastomer mass is vulcanized.

In embodiments of the invention, the vibration absorber 10 includes stops 40, 44 for the absorber mass 12 that are integrated into the design. The vibration amplitude of the absorber mass 12 is limited thereby in both axial directions as well as in the radial direction, so that the stress caused by elongations of the elastomer body 20 is limited in all directions. Hence, damage to the elastomer body 20 is avoided.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGN LIST

10 Vibration Absorber
12 Absorber mass
14 Spring member
16 Inner sleeve
18 Outer sleeve
20 Elastomer body
22 Opening
24 Passage
26 Securing element
28 Projection
30 First end
32 Second end
34 Outer circumference
36 Elastomer layer
38 Step
40 First stop
42 Bent second portion
44 Second stop
46 Inner face
48 Spoke
50 Bent first portion
R Radial direction
A Axial direction
$A_1$ First axial direction
$A_2$ Second axial direction
$x_1$ First distance
$x_2$ Second distance

What is claimed is:

1. A vibration absorber for damping vibrations of a motor vehicle component, the vibration absorber comprising:
   an absorber mass including a passage,
   an elastomeric spring member inserted in the passage of the absorber mass, the elastomeric spring member comprising:
   an outer sleeve connecting the elastomeric spring member to the absorber mass,
   an inner sleeve for attachment to the motor vehicle component to undergo vibration absorption,
   an elastomer body interconnecting the inner sleeve and the outer sleeve, and
   a securing element including at least one projection that extends in a radial direction outwardly from the inner sleeve; and
   stops that are spaced apart in an axial direction and cooperate with the securing element to secure the absorber mass in the axial direction, a first of the stops including a bent first portion of the outer sleeve at a first end thereof which extends inwardly in the radial direction and overlaps with the at least one projection in the radial direction.

2. The vibration absorber as recited in claim 1, wherein the vibration absorber is configured to absorb vibrations in a region of a chassis of the motor vehicle.

3. The vibration absorber as recited in claim 1, wherein a second of the stops is disposed on the absorber mass or the outer sleeve.

4. The vibration absorber as recited in claim 1, wherein the at least one projection includes a plurality of projections projecting from the inner sleeve in a radial direction, the projections being disposed on an outer circumference of the inner sleeve and offset in a circumferential direction.

5. The vibration absorber as recited in claim 1, wherein the elastomer body comprises radially projecting spokes.

6. The vibration absorber as recited in claim 1, wherein the securing element is coated with an elastomer layer.

7. The vibration absorber as recited in claim 1, wherein the absorber mass includes a step projecting in a direction of the passage, a second of the stops being formed from the step.

8. The vibration absorber as recited in claim 1, wherein a second of the stops includes a radially inwardly bent second portion of the outer sleeve at a second end thereof.

9. The vibration absorber as recited in claim 1, wherein the outer sleeve comprises an inner face including an elastomer layer.

10. The vibration absorber as recited in claim 1, wherein a space is provided in the radial direction from an end of the at least one projection to an inner surface of the outer sleeve such that the at least one projection is configured as a radial stop for the absorber mass.

* * * * *